United States Patent [19]

Abe et al.

[11] Patent Number: 4,556,380
[45] Date of Patent: Dec. 3, 1985

[54] PRESS FOR ADJUSTING AND INSPECTING MOLDS

[75] Inventors: Shuji Abe; Tatsumi Abe, both of Ashikaga; Fumimaro Sakamoto, Numazu, all of Japan

[73] Assignee: Abeseiki Co., Ltd., Ashikaga, Japan

[21] Appl. No.: 684,948

[22] Filed: Dec. 21, 1984

[30] Foreign Application Priority Data

Dec. 21, 1983 [JP] Japan ............................... 58-239864

[51] Int. Cl.⁴ .......................... B29F 1/00; B29C 17/00
[52] U.S. Cl. .................................................. 425/188
[58] Field of Search .................... 425/150, 188, 192 R, 425/193, 411

[56] References Cited

U.S. PATENT DOCUMENTS

| | | | |
|---|---|---|---|
| 2,773,283 | 12/1956 | Malamoud et al. | 425/188 |
| 3,128,501 | 4/1964 | Borah | 425/411 X |
| 3,140,513 | 7/1964 | Campbell et al. | 425/411 X |
| 3,204,292 | 9/1965 | Schon | 425/411 X |
| 3,307,220 | 3/1967 | Underwood | 425/411 X |
| 4,005,961 | 2/1977 | Manceau | 425/188 X |
| 4,140,449 | 2/1979 | Takeshi et al. | 425/188 X |
| 4,473,346 | 9/1984 | Hehl | 425/192 R X |

Primary Examiner—J. Howard Flint, Jr.
Attorney, Agent, or Firm—Oblon, Fisher, Spivak, McClelland & Maier

[57] ABSTRACT

A press for adjusting and inspecting molds is disclosed, which comprises a vertically movable slide and two bolsters provided on the lowermost position of the opposite sides of the slide. The slide has a coupler provided on either side. Each bolster has a coupler provided on either end. The couplers of each bolster can be coupled to the respective couplers of the slide by first coupling one of them to the corresponding coupler of the slide such that the bolster can be swung relative thereto. The slide includes a bolster inverter, which consists of a piston-cylinder assembly or the like for swinging a bolster about its end detachably coupled thereto, and an inverter orientation controller for turning the end of the bolster inverter toward the respective bolsters. Two molds are disposed on the opposite sides of the lowermost position of the slide, and either one of them can be adjusted and inspected when desired.

15 Claims, 11 Drawing Figures

PRESS FOR ADJUSTING AND INSPECTING MOLDS

BACKGROUND OF THE INVENTION

1. Field of the Invention

This invention relates to a press for adjusting and inspecting molds used for plate processing, plastic injection molding or the like, and more particularly, to a press for adjusting and inspecting molds, in which upper and lower halves of a mold can be assembled together for detecting and adjusting defective portions or making a trial molding to check whether the molded product aimed at can be obtained, by securing a bolster supporting the upper half of the mold to the bottom of a slide vertically movable above a bed with the upper mold half down, securing the lower half of the mold to a car movable along the bed, moving the car with the lower mold half to a position at which the lower mold half is directly beneath the lowermost position of the upper mold half and then lowering the slide.

2. Description of the Prior Art

When a mold used for plate processing or plastic injection molding is fabricated, its adjustment is carried out along with performance tests conducted during the last stage of its fabrication. More specifically, upper and lower halves of the mold are assembled together into the state in which the mold is used and a check is carried out as to whether the two mold halves match each other as intended or trial molding is carried out to check whether the intended molded product can be obtained. If any defect is detected, an adjustment is effected. For the adjustment, a die stopping press or like has heretofore been employed. In this prior art press, a bolster which supports the upper half of a mold secured thereto is pivotally coupled to one side of a slide, and an end of a bolser inverter, which consists of a piston-cylinder assembly or the like mounted in the slide, is linked to the top of the bolster. The slide is first raised to an upper position, and the piston is extended to suspend the bolster from one side of the slide such that the bolster makes an angle slightly over 90°. Then the slide is lowered to outwardly push the suspended bolster. In this way, the bolster is inverted 180° when the slide is lowered to a position substantially on the bed. In this structure, in which the bolter is coupled to one side of the slide such that it cannot be readily taken out thereof, one press can handle only a single mold at a time for adjustment.

SUMMARY OF THE INVENTION

An object of the invention, accordingly, is to provide a press, which permits simultaneous operations with two molds for adjustment such that the upper and lower halves of a mold can be assembled for adjustment or trial molding while the upper and lower halves of the mother mold are being finished or repaired, thus permitting improvement of the operation efficiency.

To attain the above object of the invention, there is provided a press for adjusting and inspecting molds, which comprises a vertically movable slide having a coupler provided on either side; a pair of bolsters provided on the opposite sides of the lowermost position of the slide and each having a coupler provided at each end and capable of being detachably coupled to the respective opposite side couplers of the slide; a bolster inverter linkable to the back side of each bolster for swinging the bolster; and an inverter orientation controller coupled to the bolster inverter for controlling the inclination of the bolster coupled thereto.

For the adjustment of or trial molding with either of the two molds on the opposite sides of the lowermost position of the slide, the coupler at one end of the bolster concerned is pivotally coupled to the coupler on the corresponding side of the slide. In this state, the slide is lifted, whereby the bolster is suspended by the slide. Then the bolster is upwardly turned by the bolster inverter. When the coupler at the other end of the bolster is brought into alignment with the coupler on the other side of the slide, the two couplers are coupled together. In this way, the bolster is held with the upper mold half facing downward. The other bolster can be likewise handled for adjustment of the mold thereon, when desired. The process of inspecting one mold can be carried out simultaneously with the process of machining the other, and the operation efficiency of the press can be improved.

BRIEF DESCRIPTION OF THE DRAWINGS

The above and other objects and features of the invention will become more apparent from the following description when the same is read with reference to the accompanying drawings, in which.

DESCRIPTION OF THE PREFERRED EMBODIMENTS

Figure 1:
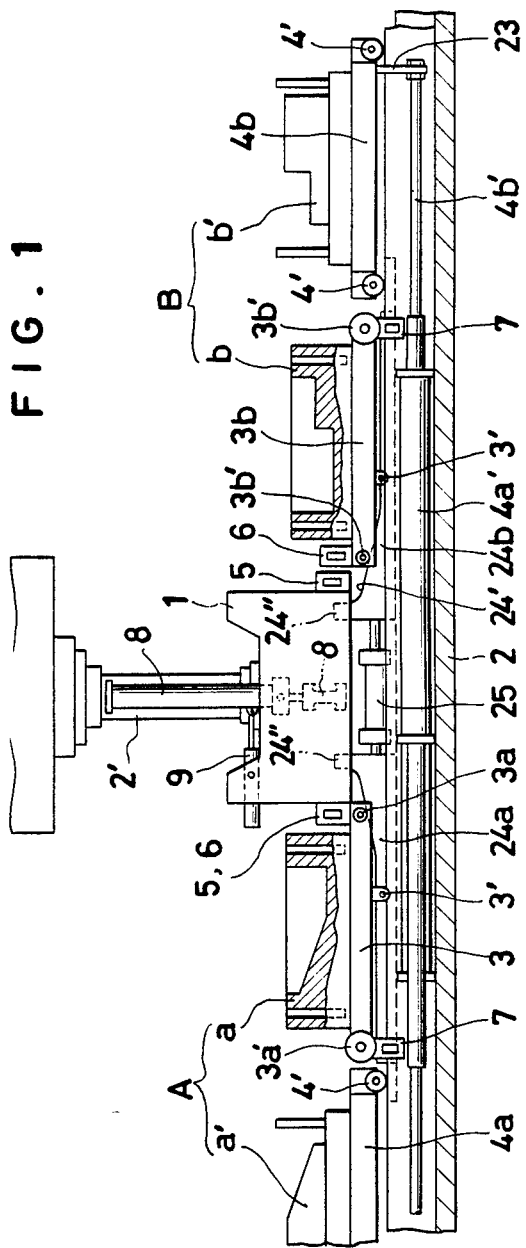
FIG. 1 is an elevational view showing an embodiment of the invention under simultaneous processes with two molds.

Now, the invention will be described in conjunction with the illustrated embodiments thereof.

Referring to the Figures, reference numeral 1 designates a slide, and 2 a bed. The slide 1 is secured to the lower end of a ram 2' depending from a top beam (or crown) of a gate-shaped frame striding the bed 2. The slide 1 is guided by a vertical guide of the gate-shaped frame as it is raised and lowered with the elongation and contraction of the ram. In its lowermost position, it is in the vicinity of the bed.

Two bolsters 3a and 3b are provided on the bed 2 on the opposite sides of the lowermost position of the slide 1. The bolster 3a supports an upper half a of a mold A secured to its top, and the bolster 3b supports an upper half b of a mold B secured to its top. A car 4a supporting a lower half a' of the mold A is provided on the outer side of the bolster 3a, and a car 4b supporting a lower half b' of the mold B is provided on the outer side of the bolster 3b. The cars 4a and 4b can be moved along the bed with the elongation and contraction of piston-cylinder assemblies 4a' and 4b' of the multi-stroke or like type, and they can be brought to a position directly beneath the lowermost position of the slide.

Each side of the slide 1 is provided with a coupler 5, to which the corresponding end of each of the bolsters 3a and 3b can be coupled. Each bolster is provided at its end nearest the associated coupler 5 with a coupler 6 which can be coupled thereto and at the other end with another coupler 7 which can be coupled to the other coupler 5. The couplers 6 and 7 may be of the same structure or of different structures, as will be described later in detail.

Figure 2:
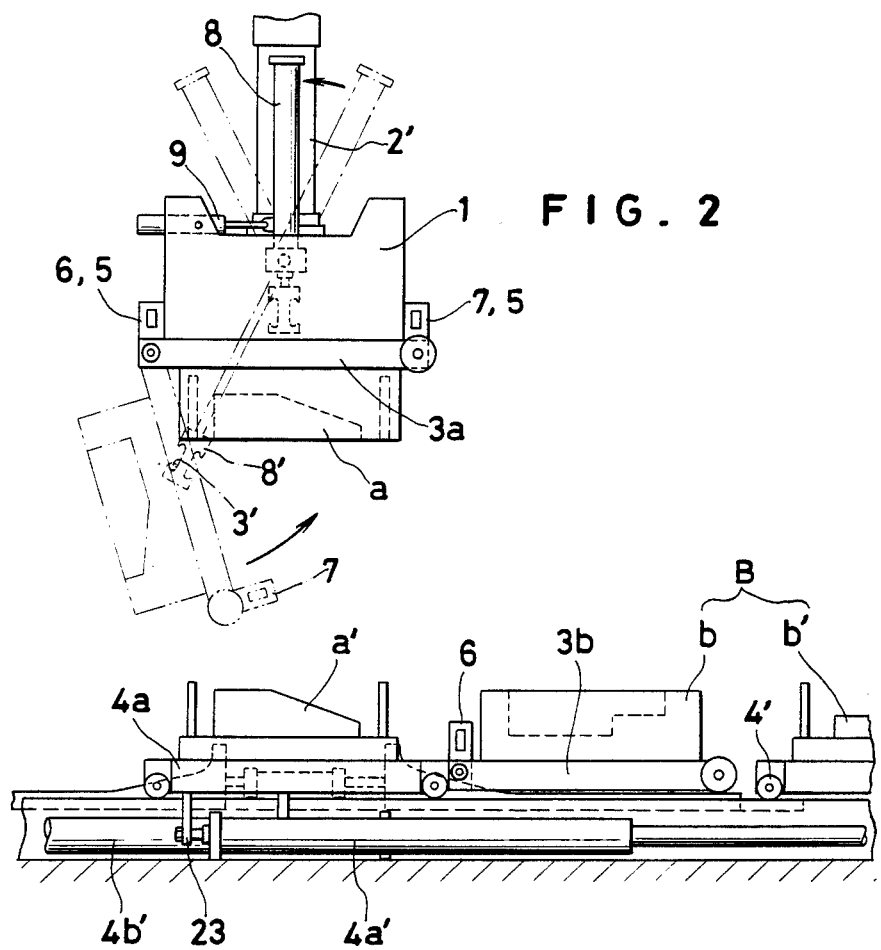
FIG. 2 is an elevational view showing the same embodiment with one of the molds in a state for adjustment or trial molding.
Figure 3:
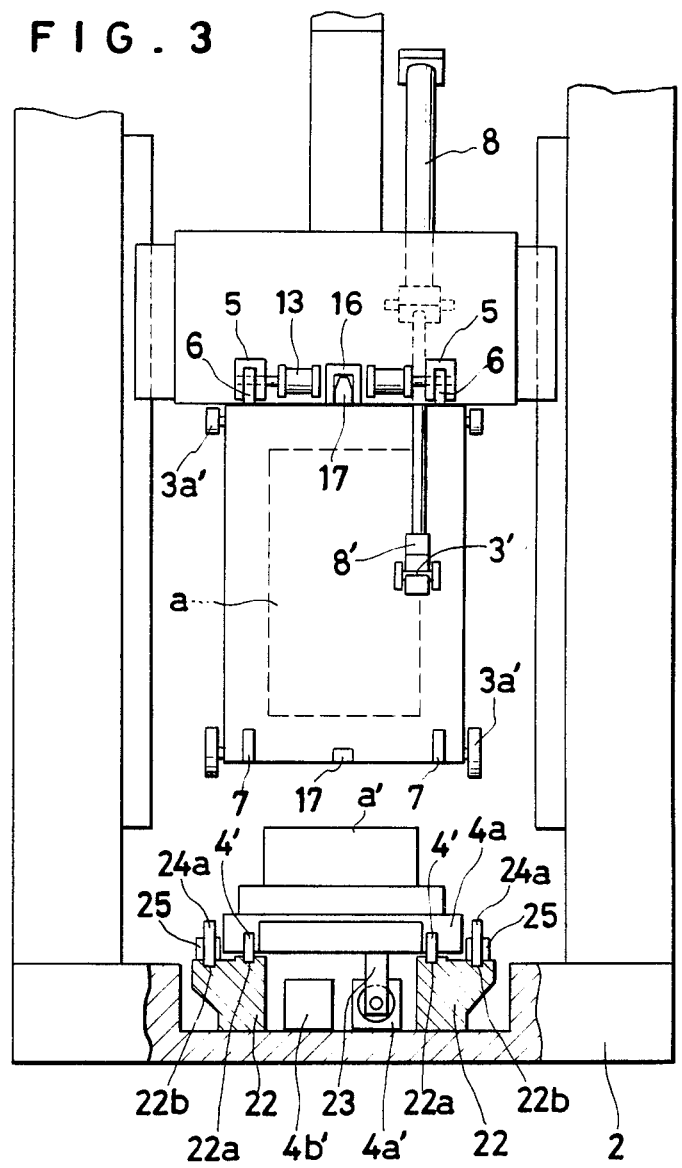
FIG. 3 is a side view, partly in section, showing the same embodiment, with the upper half of one mold suspended from the slide.

In FIG. 1, the right side mold B is in the process of being machined, while the left side mold B has been machined and the coupler 6 of the bolster 3a supporting the upper mold half a is coupled to the left side coupler 5 of the slide 1 for adjustment or trial molding. In FIG. 2, the slide 1 is shown raised together with the bolster 3a and the upper mold half a, with the bolster 3a inverted by a bolster inverter 8 consisting of a piston-cylinder assembly or the like provided in the slide 1 so that the top side of the bolster is held in close contact with the bottom of the slide and the other end coupler 7 of the bolster 3a coupled to the other side coupler 5 of the slide. FIG. 3 is a side view showing the slide (which is shown by phantom lines in FIG. 2) suspending the bolster.

After the coupler 6 at one end of the bolster 3a has been coupled to the coupler 5 on one side of the slide 1, the slide is lifted up to an intermediate position, at which the other end of the bolster is not separated from the bed. In this state, the bolster inverter 8 is tilted to the right or left toward the coupled bolster by an inverter orientation controller 9 consisting of a piston-cylinder assembly or the like provided in the slide. Then, the piston of the bolster inverter, for instance, is extended to a predetermined extent. Subsequently, the lifting of the slide is resumed. When the other end of the bolster is separated from the top of the bed as the slide is lifted, the bolster with the upper mold half is suspended in an inclined orientation as shown by phantom lines in FIG. 2 due to the gravitational forces, so that a pin 3' provided on the bolster enters a hook of a shackle 8' provided at the free end of the extended bolster inverter 8. When the slide is brought to the uppermost position and stopped, the piston of the bolster inverter 8 is retracted, whereby the bolster 3a is turned upwards to be brought into close contact in the inverted state with the bottom of the slide. Subsequently, the coupler 7 at the other end of the bolster a is coupled to the right side coupler 5 of the slide. Then, the car 4a supporting the lower mold half a' is moved to the position directly beneath the lowermost position of the slide. As the bolster inverter 8 turns the bolster upwards, it recovers its initial vertical orientation. The inverter orientation controller 9 is thus held released so that the piston can be retracted into and extended from the cylinder. The shackle 8' at the end of the bolster inverter continually has the pin 3' hooked therein after the coupling of the bolster's coupler to the slide's coupler, thus blocking an oil hydraulic circuit of the bolster inverter 8 to prevent extension of the piston. Thus, it serves as a safety device in this situation.

Subsequently, the slide is lowered to fit the upper half a of the mold to the lower half b thereof for the matching check or trial molding.

The adjustment of or trial molding with the other mold B can be done during machining of the mold A by coupling the coupler 6 at one end of the bolster 3b to the right side coupler 5 of the slide, tilting the bolster inverter 8 in the reverse way with the inverter orientation controller 9 and then securing the bolster 3b supporting the upper half b of the mold B to the bottom of the slide.

As has been described, the invention provides an outstanding feature enabling a single press to simultaneously process two molds. Namely, while one of the two molds A and B is being machined, adjustment of or trial molding with the other mold can be carried out by securing the bolster 3a or 3b supporting the upper half of the mold to the opposite side couplers 5 of the slide.

Figure 4:
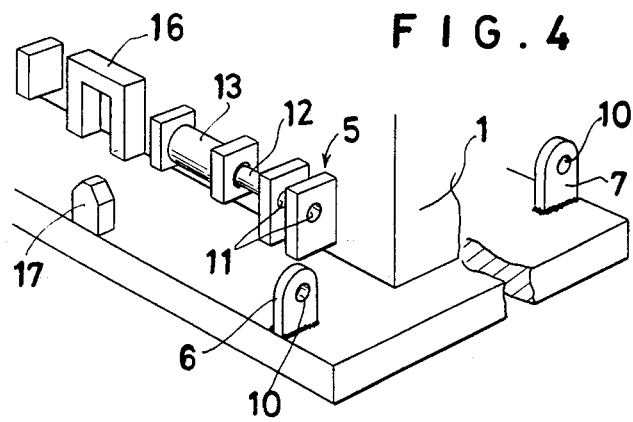
FIG. 4 is a perspective view, partly broken away, showing an example of the couplers or the slide and couplers of the bolster.

The couplers 5 on opposite sides of the slide and the couplers 6 and 7 on opposite sides of the bolsters 3a and 3b may be of any of various different structures. The couplers 6 and 7 may be of the same structure or of different structures. FIG. 4 and following Figures show some typical examples of the structure of these couplers.

FIG. 4 shows a case where the couplers 6 and 7 have the same structure. The couplers 6 and 7 stand upright from the top of both ends of the associated bolster. They each have a circular hole 10 formed in the upper end portion. Each coupler 5 of the slide consists of two coupler members projecting sidewise from each side of the slide and spaced apart a distance such that the coupler 6 or 7 can intrude into the gap between them. The two coupler members have respective circular holes 11, which are aligned with the hole 10 of the coupler 6 or 7 when the top of the bolster is brought into close contact with the bottom of the slide. To couple the coupler 6 at one end of each bolster, the slide is lowered to bring the coupler 6 into the gap between the pair coupler members of the coupler 5 on a given side of the slide and align the holes 10 and 11, and a bolt is passed through the aligned holes 10 and 11 and is retained by a nut. In this way, the coupling of the coupler 6 is completed. At this time, the bolt serves as a pivot for the bolster.

After the coupler 6 is coupled, the slide is lifted to completely suspend the bolster, and then the bolster is turned by the bolster inverter to bring the top of the bolster into close contact with the bottom of the slide. Consequently, the coupler 7 intrudes into the gap between the pair coupler members of the other side coupler of the slide and the holes 10 and 11 are aligned. Thus, a bolt may likewise be passed through the aligned holes and then retained by a nut.

To couple the couplers 7 and 5 together by passing the bolt in the above way in a manual operation, it may sometimes be necessary to lower the slide once by keeping the top of the bolster in close contact with the bottom of the slide with the bolster inverter.

To obviate such inconvenience, a small size piston-cylinder assembly 13 may be provided on each side of the slide near each coupler 5 such that a pin 12 provided on a rod extending from the piston can be inserted through the hole 11. With this arrangement, after the holes 10 and 11 are aligned, the piston of the piston-cylinder assembly 13 may be extended to insert the pin 12 through the holes. This arrangement enables the coupling and decoupling of the couplers 5 and 6 or 7 by remote control.

Figure 5:
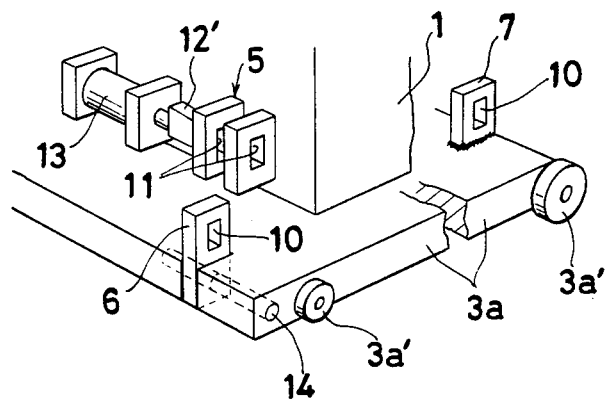
FIG. 5 is a view similar to FIG. 4 but showing a different embodiment of the couplers of the slide and couplers of the bolster.

In the case of FIG. 5, the couplers 5, 6 and 7 have non-circular holes 10 and 11. Accordingly, the piston end of the piston-cylinder assembly 13 is provided with a member 12' which can be adequately inserted through the non-circular holes 10 and 11. In this instance, the member 12' cannot serve as a pivot for the bolster, so that at least the coupler 6 is provided on a rotatable shaft 14 provided at one end of the bolster. The couplers in the structure shown in FIG. 5, can be coupled and decoupled entirely in the same way as in the structure of FIG. 4 where the piston-cylinder assembly 13 is used.

Where the coupler at one end of the bolster is pivotably coupled to a given side of the slide by passing a bolt or the pin 12 or member 12' of the piston-cylinder assembly through the holes 10 and 11 and likewise the coupler at the other end of the bolster is coupled to the other side of the slide, the precision of securement of the bolster to the slide is usually required to be within 1/100 mm.

Figure 6:
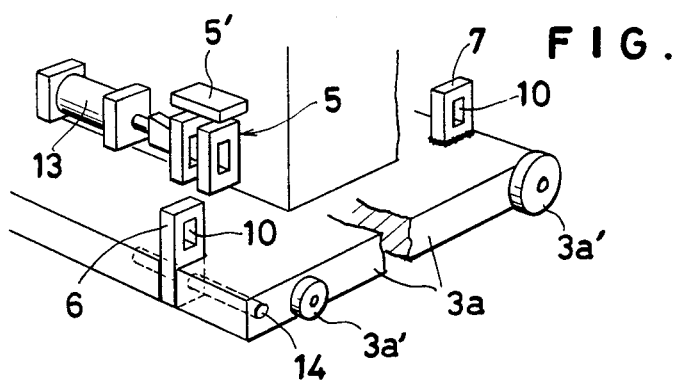
FIG. 6 is a view similar to FIG. 4 but showing a further example of the couplers of the slide and couplers of the bolster.
Figure 7:
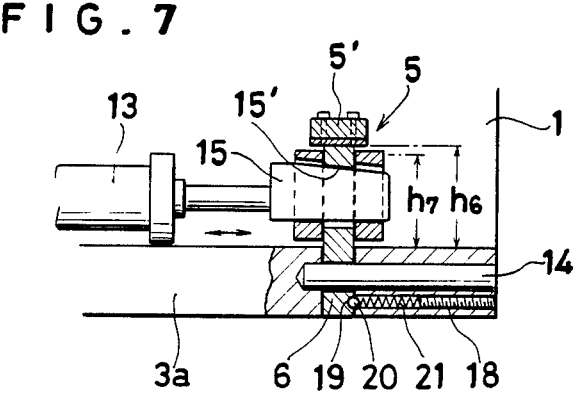
FIG. 7 is an elevational view, partly in section, showing part of the example of FIG. 6 in a coupled state.
Figure 8:
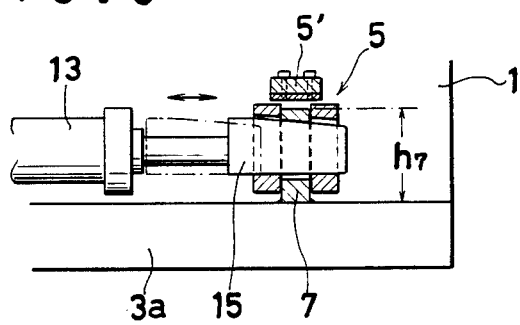
FIG. 8 is an elevational view, partly in section, showing a different part of the example of FIG. 6 in a coupled state.

FIGS. 6 through 9 illustrate some arrangements which can sufficiently meet the precision as required above. As shown in FIGS. 6 to 8, an upper wall member 5' is secured in position above the gap between the two coupler members of the coupler 5. In addition, a wedge-shaped end member 15 with at least the upper surface thereof inclined downwards toward the end, is mounted on the pin extending from the piston-cylinder assembly 13. The hole of the coupler 6 to 7 has an inclined upper wall surface conforming to the inclined upper surface of the member 15. The lower wall surface of the hole 10 is adapted to be slightly spaced apart from the lower surface of the wedge-shaped end member 15. With the holes 11 of the coupler members of the coupler 5, the lower wall surface is adapted to be in frictional contact with the lower surface of the wedge-like end member as the member is inserted, while the upper surface is adapted to be slightly spaced apart from the upper surface of the wedge-like end member. With this arrangement, when the wedge-like end member 15 is inserted into the holes 10 and 11 with the extension of the piston, the coupler 6 or 7 tends to be raised by a cam action produced between the upper surface of the wedge-like end member and the upper wall surface of the hole 10 of the coupler 6 or 7. As is clearly shown in FIGS. 7 and 8, the height h6 of the upper end of the coupler 6 from the top surface of the bolster is slightly greater than the height h7 of the upper end of the coupler 7. In addition, the upper end of the coupler 6 is adapted to be in contact with the lower surface of the upper wall member 5' when the top of the bolster is brought into close contact with the bottom of the slide. Since very high precision is required as noted above, a plate or sheet having an optimum thickness may be provided on the top surface of the coupler or the bottom surface of the upper wall member 5' by the trial-and-error method or the like so that the upper end of the coupler is just brought into contact with the lower surface of the upper wall member 5' when the top of the bolster is just brought into close contact with the bottom of the slide.

When the bolster is suspended, the coupler 6 is intruded into the gap between the pair coupler members of the coupler 5 until its upper end is in contact with the lower surface of the upper wall member, and then the wedge-shaped end member 15 is inserted into the holes 10 and 11. In this way, one end of the bolster is pivotably coupled to a given side of the slide. The pivot of the bolster in this case is constituted by the shaft 14, which is provided at one end of the bolster and carries the coupler. Subsequently, the slide is lifted to suspend the bolster, and then the bolster is turned by the bolster inverter to bring the top of the bolster into close contact with the bottom of the slide. Thereafter, the piston of the piston-cylinder assembly 13 on the other side of the slide is extended to insert the wedge-shaped end member into the holes 10 and 11 of the couplers 5 and 7. Since the height of the coupler 7 is smaller than that of the coupler 6 as mentioned earlier and also there is a gap between the coupler 7 and the upper wall member in the coupler 5, the wedge-like end member raises the coupler 7, whereby the top of the bolster is completely brought into close contact with the bottom of the slide. That is, the wedge-shaped end member 15 intrudes into the holes 10 and 11 to raise the coupler 7 until the top of the bolster is completely brought into close contact with the bottom of the slide. Of course the wedge-shaped end member for coupling the coupler 6 to the coupler 5 on one side of the slide may be stopped when its end has entered the hole 10, and the subsequent insertion may be caused simultaneously with the insertion of the wedge-like end member into the holes 10 and 11 of the coupler 7 and the coupler 5 on the other side of the bolster, whereby both the couplers 6 and 7 may be simultaneously raised by the wedge-like end members on the opposite sides of the slide to bring the top of the bolster into close contact with the bottom of the slide. In this case, the upper wall member 5' may be omitted, and also there is no need of providing the height difference between the couplers 6 and 7.

Figure 9:
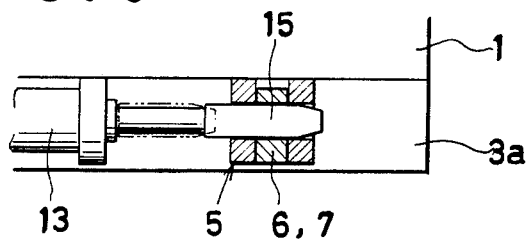
FIG. 9 is a sectional view common to FIGS. 7 and 8.
Figure 11:
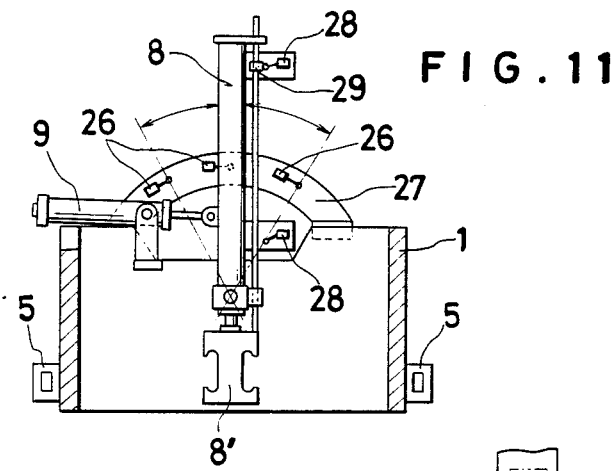
FIG. 11 is an enlarged-scale elevational view, partly in section, showing the slide.

In any case, the member which is inserted through the holes 10 and 11 by the piston-cylinder assembly or the like, may have a tapered end as is shown in FIG. 9 so that it can be smoothly guided. Further, to provide the required positioning precision for the bolster and slide with respect to each other in the transversal direction, a channel-shaped positioning member 16 open at the bottom may be provided on each side of the slide, while each end of the bolster may be provided with an upwardly projecting positioning member 17 which can slide into the gap of the channel-shaped positioning member 16, as shown in FIGS. 3 and 4.

Where the coupling member 16 is secured to the shaft 14 rotatably provided at one end of the bolster, it is desired that the coupler 6 be held in the upright state so that it can be readily fitted in the coupler 5. FIG. 7 shows an arrangement to this end. In this arrangement, each end of the bolster is formed with a transversal bore 18 formed from one side and reaching the coupler 6. The coupler 6 is formed with a recess 19, which faces the inner end of the transversal bore when the coupler is upright. A ball 20 and a spring 21 are inserted in the mentioned order in the transversal hole, and their detachment is prevented by a screw, with the ball 20 urged so that it is engaged in the recess 19. With this arrangement, when the bolster is turned, the ball is forced out of the recess to be in contact with the corresponding surface of the coupler. When the couplers 5 and 6 are decoupled after lowering the slide, inverting the bolster and putting it on the bed, the state of the coupler 6 held upright is recovered. Thus, the coupler 6 can be subsequently readily fitted in the coupler 5 for coupling.

In this embodiment, the bed 2 has a longitudinal groove, in which a pair of rails 22 are provided. The cars 4a and 4b which support the respective lower mold halves secured on their tops can be moved along the rails 22 past the lowermost position of the slide. Each car has wheels 4' which are guided for rolling along shallow guide grooves 22a formed in the top surface of the pair rails. The multi-stroke piston-cylinder assemblies noted above, for moving the cars, are provided in the space between the pair of rails and secured to the bed in opposite fashions. Each of them has a piston end secured to a bracket 23 depending from each car. Each car is at a position directly beneath the lowermost position of the slide when each associated piston is fully retracted, for instance, while when the piston is fully extended, the car is spaced apart a maximum distance from the lowermost position of the slide so that the bolster can be located between the two. Each rail 22 also has another guide groove 22b, which is formed on the outer side of the groove 22a, i.e., at a position at a slight distance from each side of the cars 4a and 4b. In these guide grooves 22a and 22b respective guides 24a and 24b as respective pairs are slidably received, on which the respective bolsters 3a and 3b are adapted to be put.

The bolsters have substantially the same width as the cars. Accordingly, the bolsters have wheels 3a' and 3b', which are provided outside the opposite sides of the opposite ends so that they can rest on the guides.

The guides 24a and 24b, each constituted as a pair, serve to help inverting the corresponding bolster supporting the upper mold half after matching check or trial molding. They permit the bolster to be smoothly put on the bed. Although they may be omitted, they can considerably reduce the partial load exerted when the slide is lowered. Like the bolsters, the guides 24a and 24b face one another end-to-end. The guides in each pair each have an upwardly sloping top surface 24' terminating in a highest top surface 24" adjacent to the end which faces the like end of like guide in the other pair. Each guide is coupled to the piston of a drive piston-cylinder assembly 25, and can be moved a small distance along the associated guide groove 22b with the extension and retraction of the piston. In this embodiment, each piston-clinder assembly 25 has two pistons projecting in opposite directions and coupled to respective guides 24a and 24b facing end-to-end, but it is of course possible to provide an independent piston-cylinder assembly for each guide.

Figure 10:
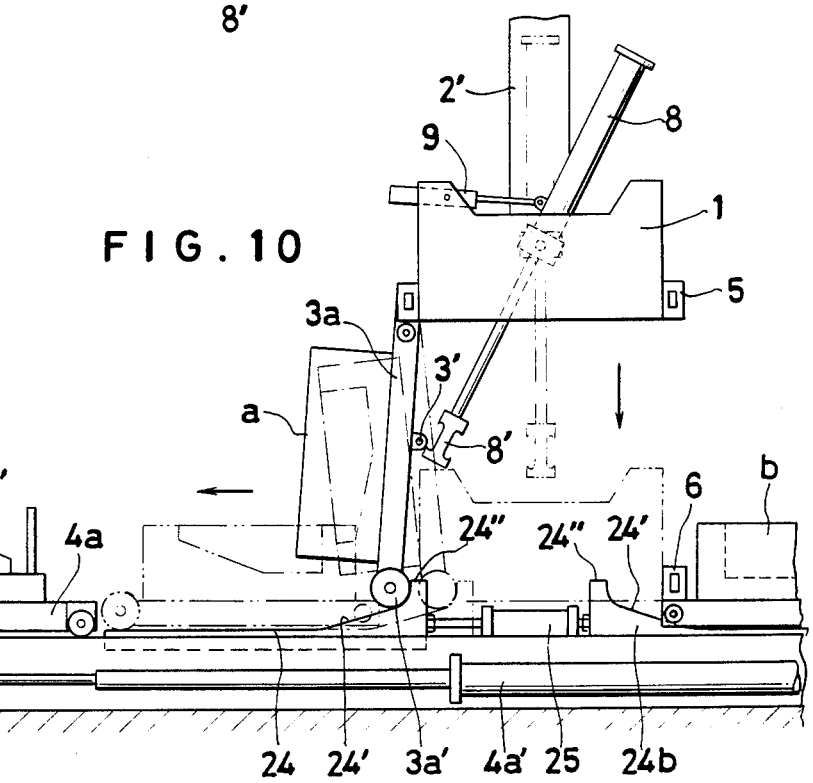
FIG. 10 is an elevational view showing the embodiment with the upper half of one mold being lowered onto the bed.

To invert the bolster and then put it on the bed, the associated guides are brought to a position beneath the lowermost position of the slide (FIG. 10). Then the couplers 7 and 5 are decoupled. The shackle 8' at the end of the bolster inverter 8 is hooking the pin 3' of the bolster at this time. The bolster inverter 8 is thus subsequently extended to a predetermined extent with the inverter orientation controller 9 released, thus bringing the bolster to a state completely suspended in an inclined state due to gravitational force. Then the slide is lowered until the wheels 3a' or 3b' at the other end of the bolster rest on the sloped top surfaces 24' of the guides (as shown by dot-and-bar lines in FIG. 10). The guides are then moved toward the other end side by the piston-cylinder assemblies 25, whereby the wheels are pushed by the highest sloped top surface portion of the guides adjacent to the highest top surface 24". At this time, the bolster is inclined by an angle of 90° or more, e.g., 110°. Consequently, the pin 3' of the bolster escapes from the hook of the shackle 8' (FIG. 10). The bolster inverter 8 is rendered vertical by the inverter orientation controller 9, and the piston is retracted. The slide is then lowered.

As the slide is lowered, the wheels roll along the sloped top surfaces 24' toward the other end of the guides, and ultimately the wheels at one end of the bolster come to rest on the sloped top surfaces 24' (as shown by double dot and bar lines in FIG. 10). At this time the bolster will be tilted on the guides if its wheels at both ends are of the same diameter. Therefore, the diameter of the wheels at the aforesaid one end is reduced such that the bolster will come to rest on the sloped top surfaces 24' substantially in a horizontal state. The wheels at the aforesaid one end may be dispensed with.

When the bolster has been brought onto the guides in the inverted state, the couplers 6 and 5 may be decoupled and, if necessary, the guides may be slightly moved from the lowermost position of the slide by the piston-cylinder assemblies 25. Usually, when the slide is lowered with the bolster turned by 90° or more by the bolster inverter 8, an extreme partial load is exerted to the slide by the upper mold half secured to the bolster, thus giving rise to extreme friction between the slide and the vertical guide of the gate-shaped frame that guides the slide. By the provisions of the guides 24a and 24b, the above problem can be solved and the slide can be lowered with the bolster turned by an angle within 90°.

The orientation of the bolster inverter is controlled by the inverter orientation controller 9 when turning the bolster with the coupler 6 thereof coupled to the left side coupler 5 of the slide and also when turning the bolster with the coupler 6 thereof coupled to the right side coupler 5 of the slide. Accordingly, the slide 1 is provided with a limit switch plate 27 having limit switches 26 for detecting the center (or vertical) position of the bolster inverter 8 with the piston-cylinder assembly thereof coupled to the piston end of the piston-cylinder assembly of the inverter orientation controller 9 and also the tilting of the bolster inverter by necessary angles to the left and right, so that the inverter orientation controller 9 is stopped only with the operation of the limit switches.

Further, in order to cause upward swing of the bolster with the coupler 6 thereof coupled to the coupler 1 on one side of the slide 1 into close contact with the bottom of the slide or to cause downward swing of the bolster in close contact with the bottom of the slide for putting it on the bed, the bolster inverter 8 is provided with a limit switch 28, which detects the extension of the piston from the cylinder to a predetermined extent and also the retraction of the piston, and also with an operating rod 29 for operating the limit switch 28. With this arrangement, the tilting operation of the inverter orientation controller 9 toward either side may be stopped with the operation of the limit switch. The shackle 8' provided on the end of the bolster inverter 8 is provided with opposite side hooks so that it can hook the pin 3' of the bolster to be coupled to either side of the slide.

As has been described in the foregoing, according to the invention a single press enables two molds to be subjected to different processes simultaneously, which is an outstanding effect in that in the prior art press only a single mold could be subjected to a single process at any given time.

What is claimed is:

1. A press for adjusting and inspecting molds comprising:
   a slide having a coupler provided on either side and driven for movement vertically;
   a pair of bolsters provided on the opposite sides of the lowermost position of said slide and capable of being moved toward and away from said slide, each of said bolsters supporting one of a pair of halves of a mold and having couplers provided one on either end and capable of being detachably coupled to said respective opposite side couplers of said slide;
   a pair of cars provided one on the outer side of each bolster and capable of being moved toward and away from said slide, each said car supporting the other one of the pair of halves of the corresponding mold;
   a bolster inverter linkable to a bolster suspended from said slide with one of said couplers thereof coupled to a corresponding side coupler of said slide for swinging said bolster about said coupled coupler thereof; and
   an inverter orientation controller coupled to said bolster inverter for tilting said bolster inverter by a given angle in a given direction;
   whereby the bolster in a state suspended from said slide with its coupler at one end coupled to the corresponding side coupler of the slide can be caused by said bolster inverter to swing for coupling its coupler at the other end to the other coupler of the slide in an inverted state together with the mold held supported by it.

2. A press for adjusting and inspecting molds according to claim 1, wherein each coupler of each bolster is secured to the bolster and has a circular hole, while the corresponding coupler of the slide consists of an pair of coupler members facing each other and having respective circular holes capable of being aligned with the circular hole of said coupler of the bolster, said couplers of the bolster and slide being coupled to each other with the coupler of the bolster introduced into the gap between said pair of coupler members of the coupler of the slide with the circular holes aligned with one another and a pin inserted through said aligned holes.

3. A press for adjusting and inspecting molds according to claim 1, wherein each coupler of each bolster is secured to a shaft rotatable with respect to the bolster and has a non-circular hole, while the corresponding coupler of the slide consists of a pair of coupler members facing each other and having respective non-circular holes capable of being aligned with the non-circular hole of said coupler of the bolster, said couplers of the bolster and slide being coupled to each other with the coupler of the bolster introduced into the gap between said pair of coupler members of the coupler of the slide with the non-circular holes aligned with one another and a pin inserted through said aligned holes.

4. A press for adjusting and inspecting molds according to claim 2, wherein a circular pin provided on a rod of a piston-cylinder assembly is inserted through said aligned circular holes of the couplers of the bolster and slide for coupling the two couplers and is removed for decoupling the two couplers.

5. A press for adjusting and inspecting molds according to claim 3, wherein a non-circular pin provided on a rod of a piston-cylinder assembly is inserted through said aligned non-circular holes of the couplers of the bolster and slide for coupling the two couplers and is removed for decoupling the two couplers.

6. A press for adjusting and inspecting molds according to claim 2, wherein said circular pin and aligned circular holes for receiving said circular pin are forwardly tapered.

7. A press for adjusting and inspecting molds according to claim 4, wherein said circular pin and aligned circular holes for receiving said circular pin are forwardly tapered.

8. A press for adjusting and inspecting molds according to claim 3, wherein said non-circular pin and aligned non-circular holes for receiving said non-circular pin are forwardly tapered.

9. A press for adjusting and inspecting molds according to claim 5, wherein said non-circular pin and aligned non-circular holes for receiving said non-circular pin are forwardly tapered.

10. A press for adjusting and inspecting molds according to claim 2, wherein an upper wall member is fixed relative to and above said pair of coupler members of the coupler of the slide.

11. A press for adjusting and inspecting molds according to claim 3, wherein an upper wall member is fixed relative to and above said pair of coupler members of the coupler of the slide.

12. A press for adjusting and inspecting molds according to claim 1, which further comprises bolster guides provided on the opposite sides of the lowermost position of said slide, said bolster guides each having a sloping top surface sloping upwards toward the slide side end, said opposite side bolster guides being capable of movement toward and away from the slide.

13. A press for adjusting and inspecting molds according to claim 12, which further comprises piston-cylinder assemblies provided between said bolster guides on the opposite sides of said slide for moving said bolster guides toward and away from said slide.

14. A press for adjusting and inspecting molds according to claim 1, wherein said bolster inverter includes a piston-cylinder assembly capable of being extended and retracted and a shackle provided on a rod extending from said piston-cylinder assembly and having hooks, each said bolster having a pin provided on the back side and capable of being engaged by said shackle.

15. A press for adjusting and inspecting molds according to claim 1, wherein each said bolster has at least one positioning projection, and said slide has a positioning member capable of receiving said positioning projection.

* * * * *